(12) United States Patent
King et al.

(10) Patent No.: US 8,087,838 B2
(45) Date of Patent: *Jan. 3, 2012

(54) PRINT MEDIA CARTRIDGE INCORPORATING PRINT MEDIA AND INK STORAGE

(75) Inventors: Tobin Allen King, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 94 days.

This patent is subject to a terminal disclaimer.

(21) Appl. No.: 12/558,570

(22) Filed: Sep. 13, 2009

(65) Prior Publication Data

US 2010/0002062 A1    Jan. 7, 2010

Related U.S. Application Data

(63) Continuation of application No. 11/203,173, filed on Aug. 15, 2005, now Pat. No. 7,591,547, which is a continuation of application No. 10/659,016, filed on Sep. 11, 2003, now Pat. No. 6,951,390, which is a continuation of application No. 09/436,508, filed on Nov. 9, 1999, now Pat. No. 6,626,529.

(30) Foreign Application Priority Data

Nov. 9, 1998 (AU) ........................ PP7020

(51) Int. Cl.
  *B41J 2/01*    (2006.01)
  *B41J 2/175*   (2006.01)
  *B65H 1/04*    (2006.01)

(52) U.S. Cl. ........... 400/629; 400/624; 347/86; 347/104
(58) Field of Classification Search ............... 400/624, 400/629
See application file for complete search history.

(56) References Cited

U.S. PATENT DOCUMENTS

| | | |
|---|---|---|
| 4,829,324 A | 5/1989 | Drake et al. |
| 4,904,100 A | 2/1990 | Enix |
| 4,937,676 A | 6/1990 | Finelli et al. |
| 4,961,088 A | 10/1990 | Gilliland et al. |
| 5,144,340 A | 9/1992 | Hotomi et al. |
| 5,155,502 A | 10/1992 | Kimura et al. |
| 5,240,238 A | 8/1993 | Lee |
| 5,294,782 A | 3/1994 | Kumar |
| 5,336,004 A | 8/1994 | Harada et al. |
| 5,393,152 A | 2/1995 | Hattori et al. |
| 5,408,669 A | 4/1995 | Stewart et al. |
| 5,419,543 A | 5/1995 | Nakamura et al. |
| 5,462,375 A | 10/1995 | Isobe et al. |
| 5,473,352 A | 12/1995 | Ishida |
| 5,493,409 A | 2/1996 | Maeda et al. |
| 5,520,470 A | 5/1996 | Willett |

(Continued)

FOREIGN PATENT DOCUMENTS

EP    0848540 A    6/1998

(Continued)

*Primary Examiner* — Daniel J Colilla

(57) ABSTRACT

A print media cartridge includes a housing assembly that defines a region in which a stack of print media sheets can be stored. A sheet transport mechanism is mounted in the housing assembly to feed the sheets from the housing assembly. An ink storage assembly is mounted on the housing assembly and defines at least one ink chamber in which ink can be received and an ink outlet in fluid communication with the, or each respective, ink chamber.

5 Claims, 11 Drawing Sheets

U.S. PATENT DOCUMENTS

| | | | |
|---|---|---|---|
| 5,535,371 A | 7/1996 | Stewart et al. |
| 5,559,932 A | 9/1996 | Machida et al. |
| 5,623,581 A | 4/1997 | Attenberg |
| 5,633,667 A | 5/1997 | Miyazawa |
| 5,647,484 A | 7/1997 | Fleming |
| 5,719,602 A | 2/1998 | Hackleman et al. |
| 5,946,473 A | 8/1999 | Lotspiech et al. |
| 5,971,533 A | 10/1999 | Kinoshita et al. |
| 5,971,641 A | 10/1999 | Looney |
| 6,049,450 A | 4/2000 | Cho et al. |
| 6,056,286 A | 5/2000 | Koga |
| 6,082,581 A | 7/2000 | Anderson et al. |
| 6,115,837 A | 9/2000 | Nguyen et al. |
| 6,149,256 A | 11/2000 | McIntyre et al. |
| 6,167,551 A | 12/2000 | Nguyen et al. |
| 6,219,227 B1 | 4/2001 | Trane |
| 6,270,271 B1 | 8/2001 | Fujiwara |
| 6,282,082 B1 | 8/2001 | Armitage et al. |
| 6,293,469 B1 | 9/2001 | Masson et al. |
| 6,325,488 B1 | 12/2001 | Beerling et al. |
| 6,344,904 B1 | 2/2002 | Mercer |
| 6,577,818 B2 | 6/2003 | Hirano |
| 6,626,529 B1 | 9/2003 | King et al. |
| 6,628,430 B1 | 9/2003 | Silverbrook et al. |
| 6,697,174 B2 | 2/2004 | Mercer |
| 6,835,135 B1 | 12/2004 | Silverbrook et al. |
| 6,914,686 B2 | 7/2005 | Silverbrook et al. |
| 6,915,140 B2 | 7/2005 | Silverbrook |
| 6,981,765 B2 | 1/2006 | King et al. |
| 6,999,206 B2 | 2/2006 | Silverbrook |
| 7,018,294 B2 | 3/2006 | Silverbrook et al. |
| 7,070,270 B2 | 7/2006 | King et al. |
| 7,077,748 B2 | 7/2006 | Silverbrook et al. |
| 7,079,292 B2 | 7/2006 | Silverbrook et al. |
| 7,125,337 B2 | 10/2006 | Silverbrook |
| 7,125,338 B2 | 10/2006 | Silverbrook |
| 7,146,179 B2 | 12/2006 | Parulski et al. |
| 7,158,258 B2 | 1/2007 | Silverbrook |
| 7,249,839 B2 | 7/2007 | King et al. |
| 7,255,646 B2 | 8/2007 | Silverbrook et al. |
| 7,296,304 B2 | 11/2007 | Goldsborough |
| 7,341,336 B2 | 3/2008 | King et al. |
| 7,387,573 B2 | 6/2008 | Silverbrook et al. |
| 7,430,067 B2 | 9/2008 | Silverbrook |
| 7,453,586 B2 | 11/2008 | Silverbrook et al. |
| 7,460,882 B2 | 12/2008 | Silverbrook |
| 7,468,810 B2 | 12/2008 | Silverbrook |
| 7,556,564 B2 | 7/2009 | Silverbrook |
| 7,588,323 B2 * | 9/2009 | King et al. ............ 347/84 |
| 7,591,547 B2 * | 9/2009 | King et al. ............ 347/86 |
| 7,609,410 B2 | 10/2009 | Lapstun et al. |
| 7,654,905 B2 | 2/2010 | Silverbrook |
| 7,784,931 B2 | 8/2010 | King et al. |
| 7,854,500 B2 | 12/2010 | King |
| 2004/0252332 A1 | 12/2004 | McCoog et al. |
| 2006/0133738 A1 | 6/2006 | Marcinkiewicz et al. |
| 2009/0029732 A1 | 1/2009 | Silverbrook |
| 2009/0291708 A1 | 11/2009 | Silverbrook |
| 2009/0295887 A1 * | 12/2009 | King et al. ............ 347/86 |
| 2010/0002062 A1 | 1/2010 | King et al. |

FOREIGN PATENT DOCUMENTS

| | | |
|---|---|---|
| JP | 57-107339 A | 7/1982 |
| JP | 60-204361 | 10/1985 |
| JP | 02-30543 | 1/1990 |
| JP | 03-14879 | 1/1991 |
| JP | 04-1051 | 1/1992 |
| JP | 04-105113 | 4/1992 |
| JP | 04-200184 | 7/1992 |
| JP | 04-286444 | 10/1992 |
| JP | 05-16377 | 1/1993 |
| JP | 5-64045 | 3/1993 |
| JP | 05-201081 | 8/1993 |
| JP | 05-330150 | 12/1993 |
| JP | 06-37944 | 2/1994 |
| JP | 06-149051 | 5/1994 |
| JP | 06-183117 | 7/1994 |
| JP | 07-108688 | 4/1995 |
| JP | 08-79417 | 3/1996 |
| JP | 08-90879 | 4/1996 |
| JP | 08-118653 | 5/1996 |
| JP | 08-224730 | 9/1996 |
| JP | 09-036941 | 2/1997 |
| JP | 09-113990 A | 5/1997 |
| JP | 09-116843 | 5/1997 |
| JP | 09-123474 | 5/1997 |
| JP | 09-135316 | 5/1997 |
| JP | 09-187960 | 7/1997 |
| JP | 09-267487 | 10/1997 |
| JP | 09-300645 A | 11/1997 |
| JP | 10-65780 | 3/1998 |
| JP | 10-112855 | 4/1998 |
| JP | 10-126728 | 5/1998 |
| JP | 10-164538 | 6/1998 |
| JP | 09-116843 | 12/1998 |
| JP | 2-302181 | 7/2000 |
| WO | WO 96/32274 | 10/1996 |
| WO | WO 97/04353 A | 2/1997 |
| WO | WO 97/50243 A | 12/1997 |

* cited by examiner

PRINT MEDIA CARTRIDGE INCORPORATING PRINT MEDIA AND INK STORAGE

CROSS REFERENCE TO RELATED APPLICATION

This application is a Continuation of U.S. application Ser. No. 11/203,173 filed on Aug. 15, 2005, now issued U.S. Pat. No. 7,591,547 which is a Continuation of U.S. application Ser. No. 10/659,016 filed on Sep. 11, 2003, now issued U.S. Pat. No. 6,951,390, which is a Continuation of U.S. application Ser. No. 09/436,508 filed on Nov. 9, 1999, now issued as U.S. Pat. No. 6,626,529, the entire contents of which are herein incorporated by reference.

FIELD OF THE INVENTION

The present invention relates to print media supply cartridges for printers.

The invention has been developed primarily for use as a combined paper and ink supply cartridge and will be described hereinafter with reference to this particular preferred form. However, it will be appreciated that the inventive concept is applicable to all print media cartridges including those without an integral ink supply.

SUMMARY OF THE INVENTION

According to an aspect of the present invention there is provided a print media cartridge comprising:

a housing assembly having top and bottom housing members that defines a region between the top and bottom housing members for storing a stack of print media sheets;

an ink storage assembly mounted on an underside of the bottom housing member, the ink storage assembly and the underside of the bottom housing member defining at least one ink chamber therebetween, each ink chamber including a deformable film for receiving ink between the deformable film and the underside of the bottom housing member; and ink connection nozzles in fluid communication with each respective ink chamber, wherein a portion of the bottom housing member extends beyond a peripheral edge of the top housing member to define an ink supply connection manifold with the ink storage assembly, the ink connection nozzles being located on the ink supply connection manifold. Other aspects are also disclosed.

BRIEF DESCRIPTION OF THE DRAWINGS

A preferred embodiment of the invention will now be described, by way of example only, with reference to the accompanying drawings in which.

DESCRIPTION OF PREFERRED AND OTHER EMBODIMENTS

Figure 1:
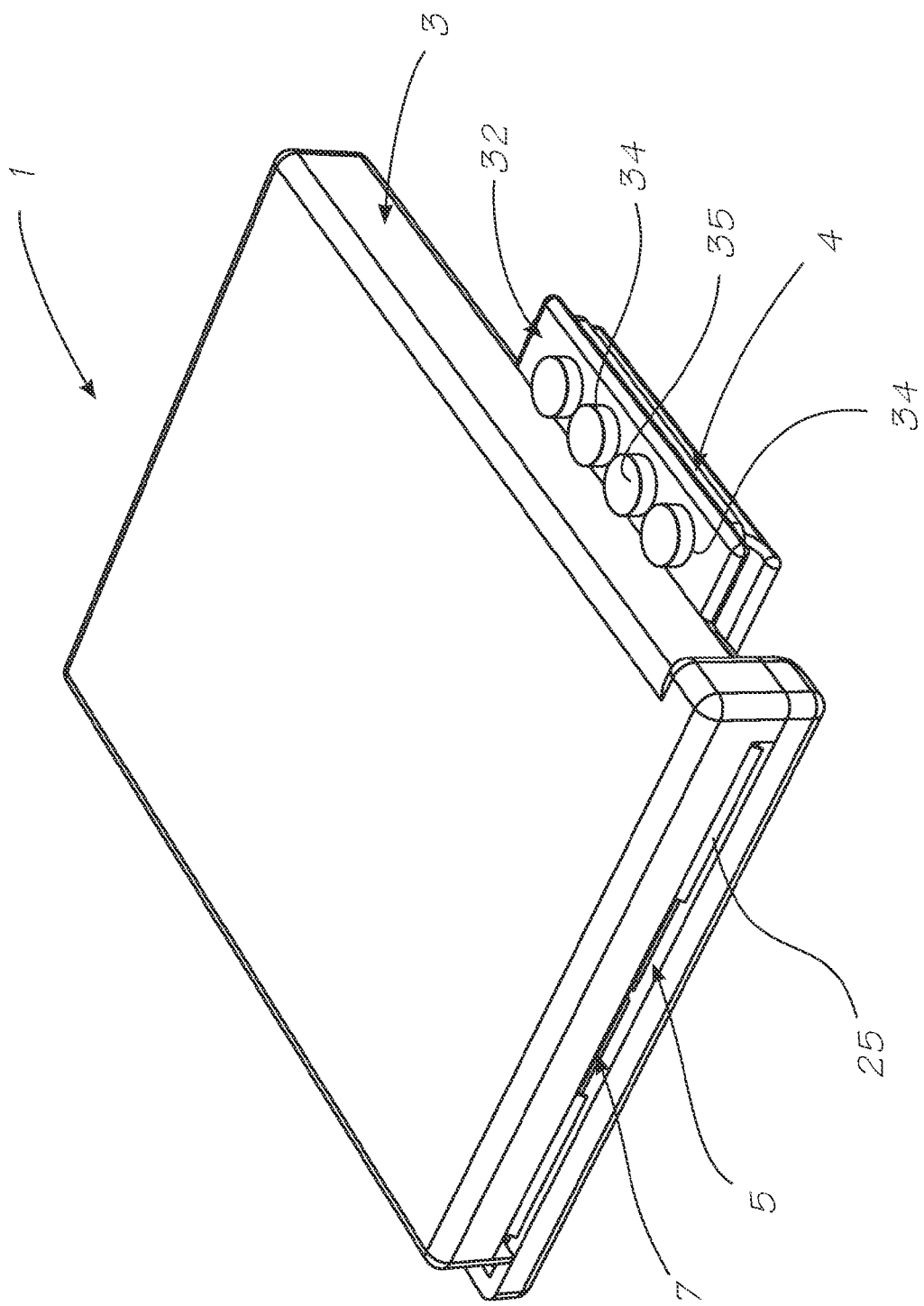
FIG. 1 is a top perspective view of a cartridge in accordance with the invention.
Figure 2:
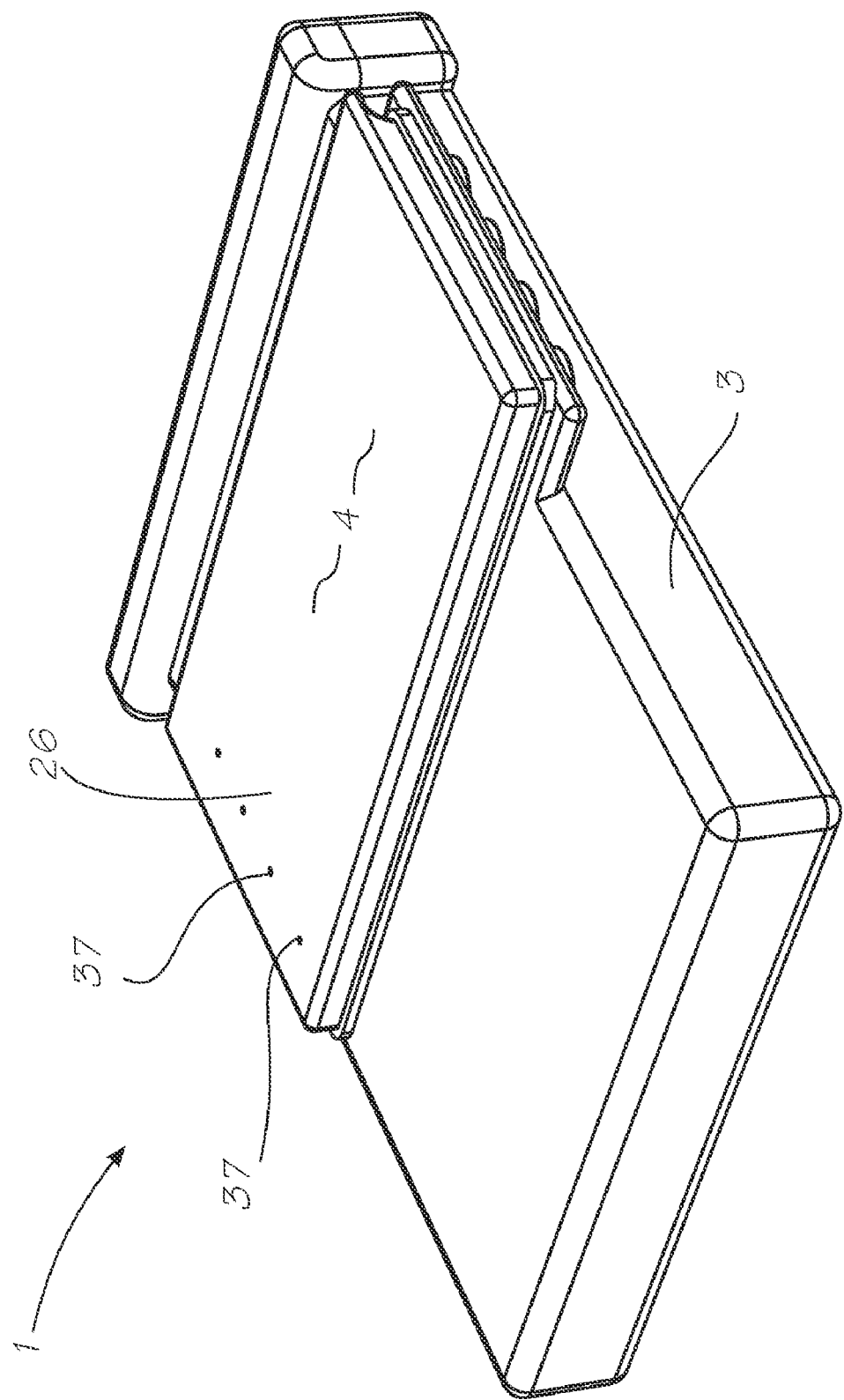
FIG. 2 is an inverted perspective view of the cartridge shown in FIG. 1.
Figure 3:
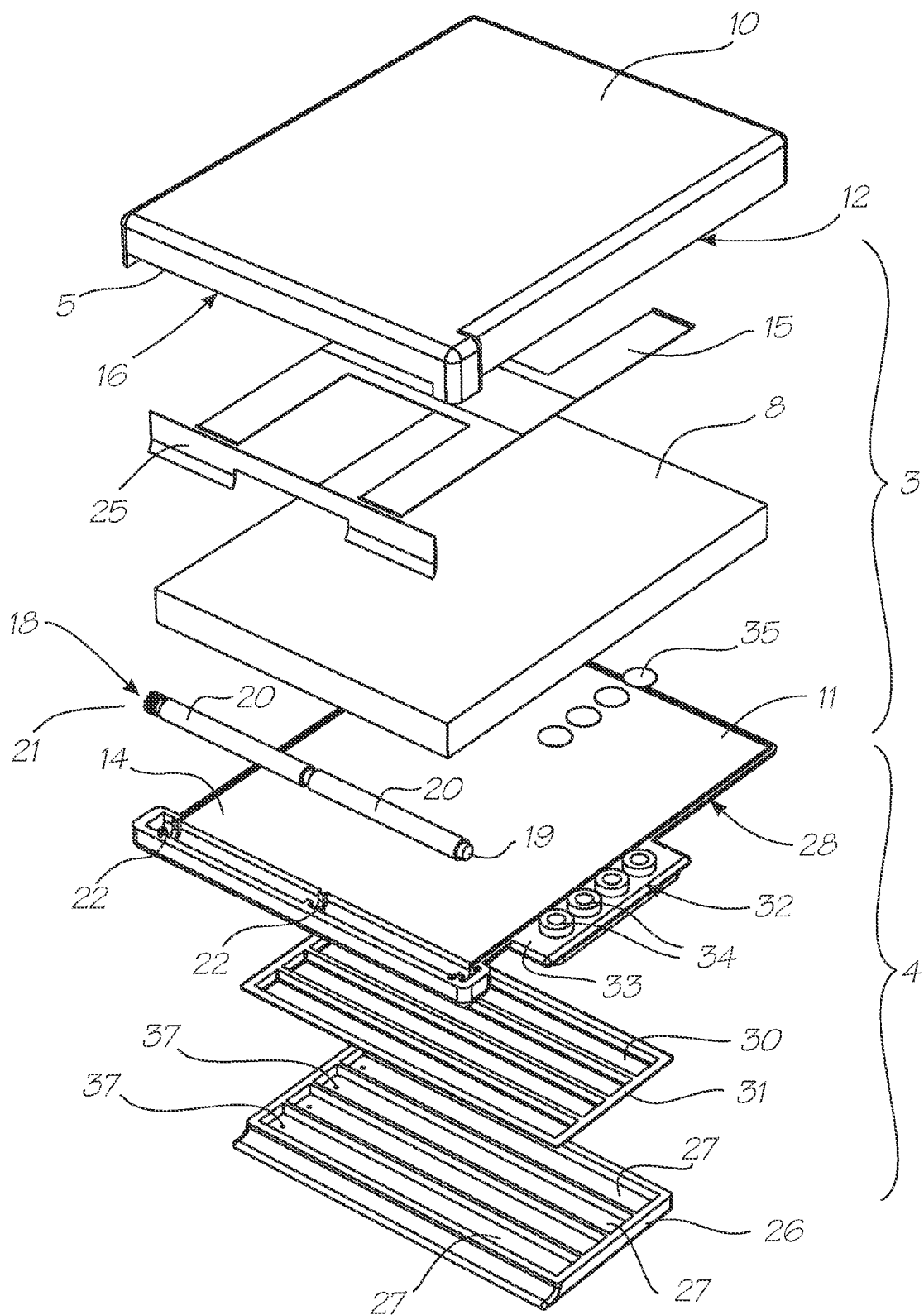
FIG. 3 is an exploded perspective top view shown in the same orientation as that shown in FIG. 1.
Figure 4:
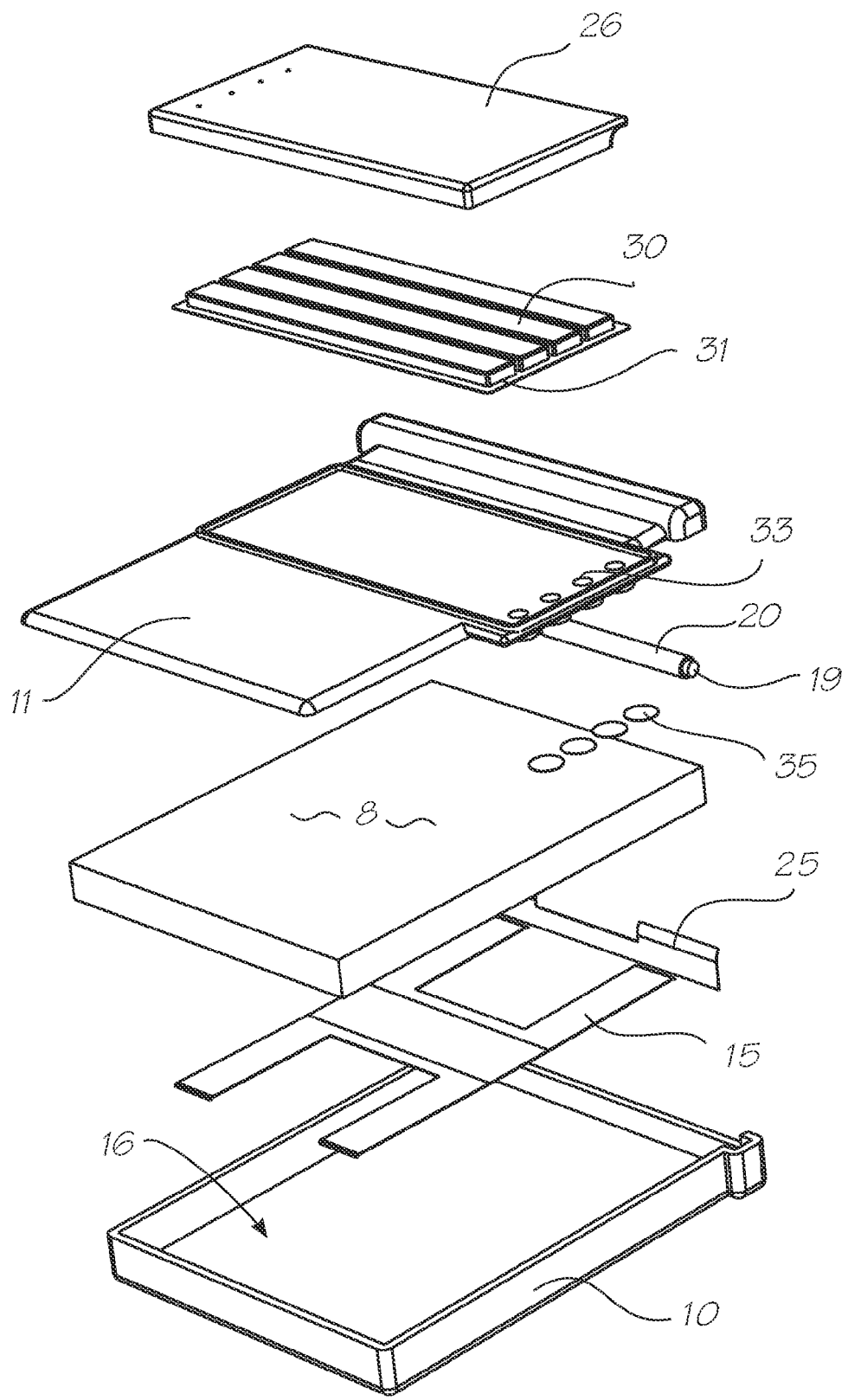
FIG. 4 is an exploded inverted perspective view shown in the same orientation as FIG. 2.
Figure 5:
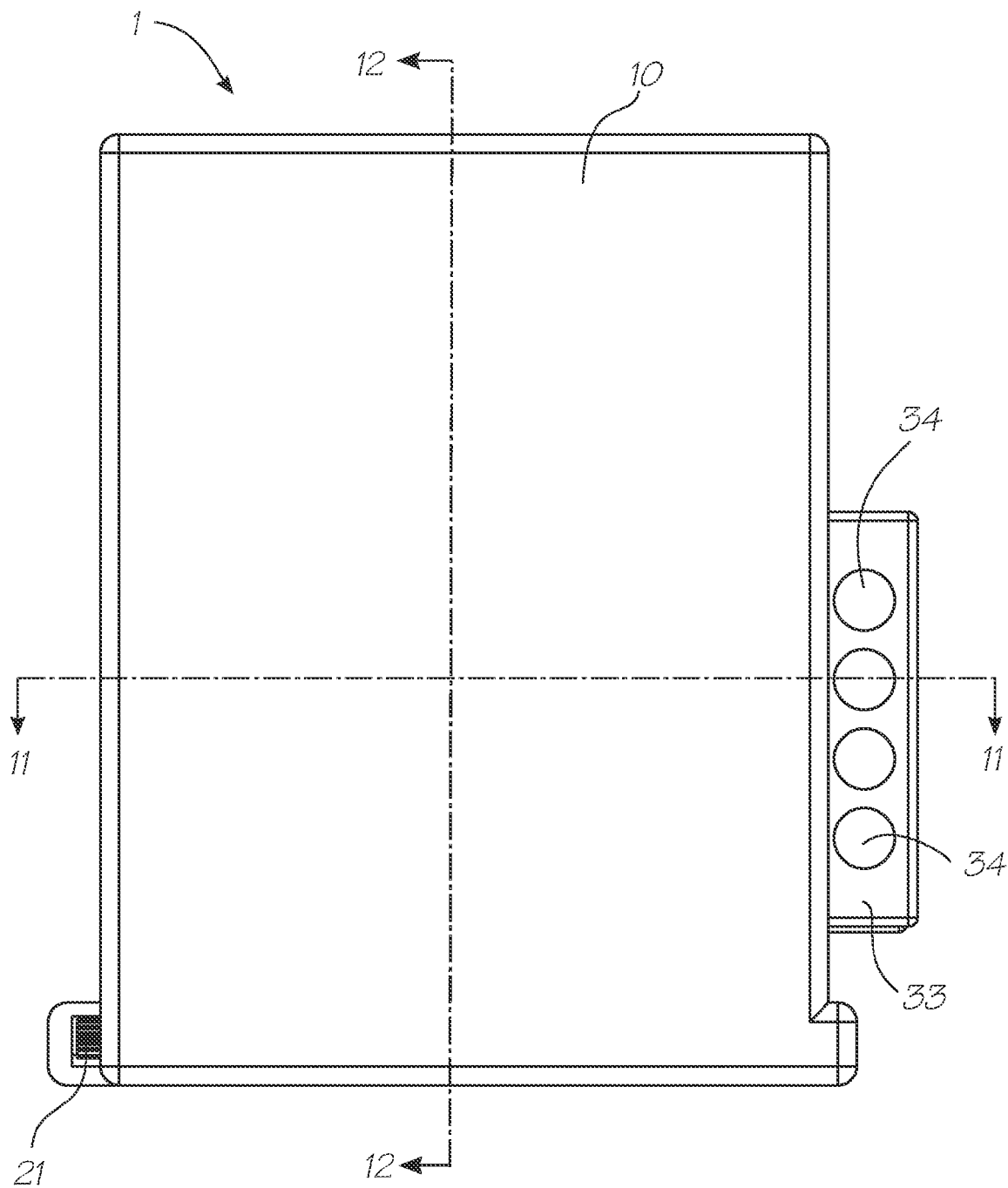
FIG. 5 is a top plan view of the cartridge of the previous figures.
Figure 6:
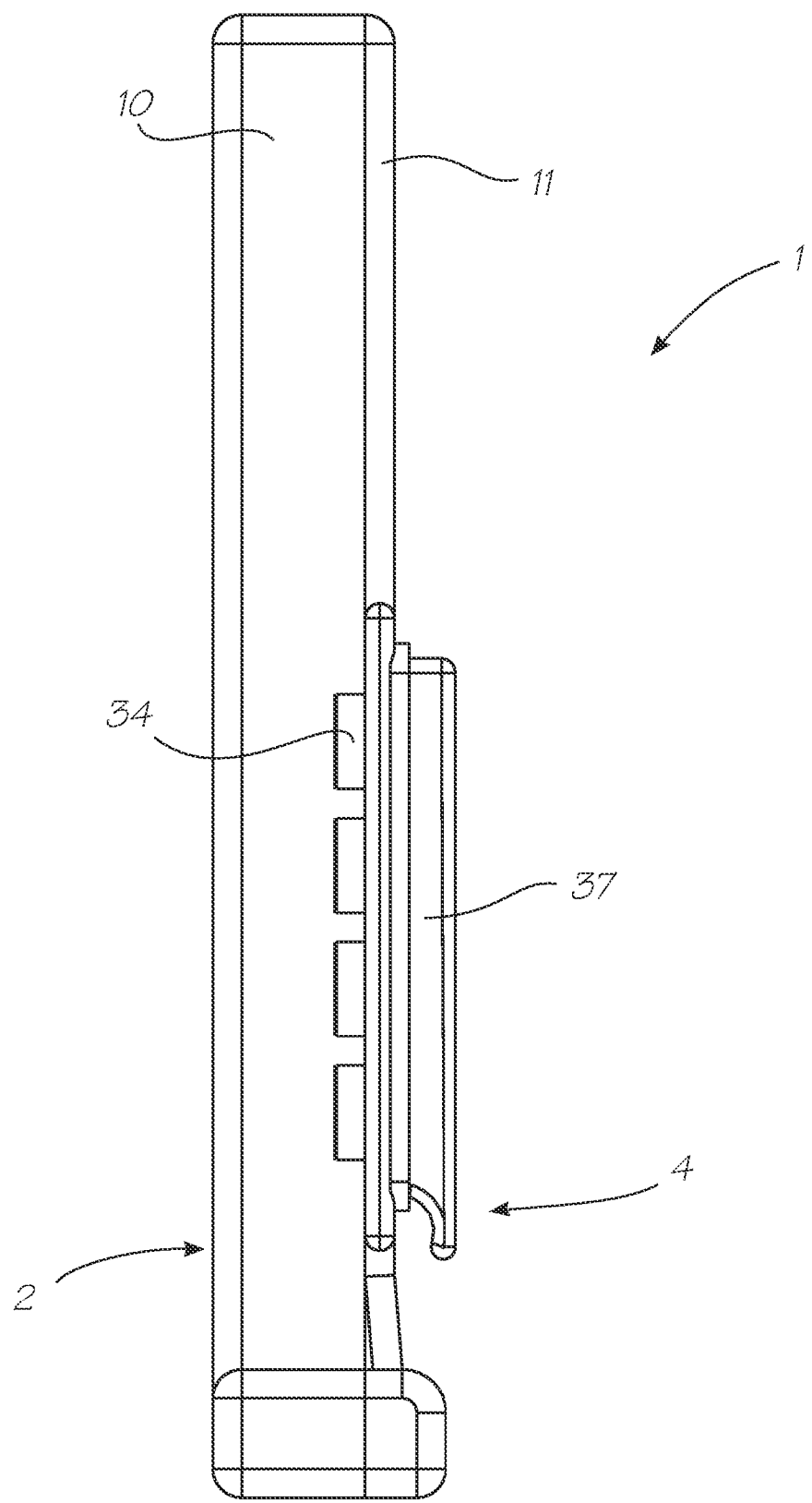
FIG. 6 is a right hand side view of the cartridge shown in FIG. 5.
Figure 7:
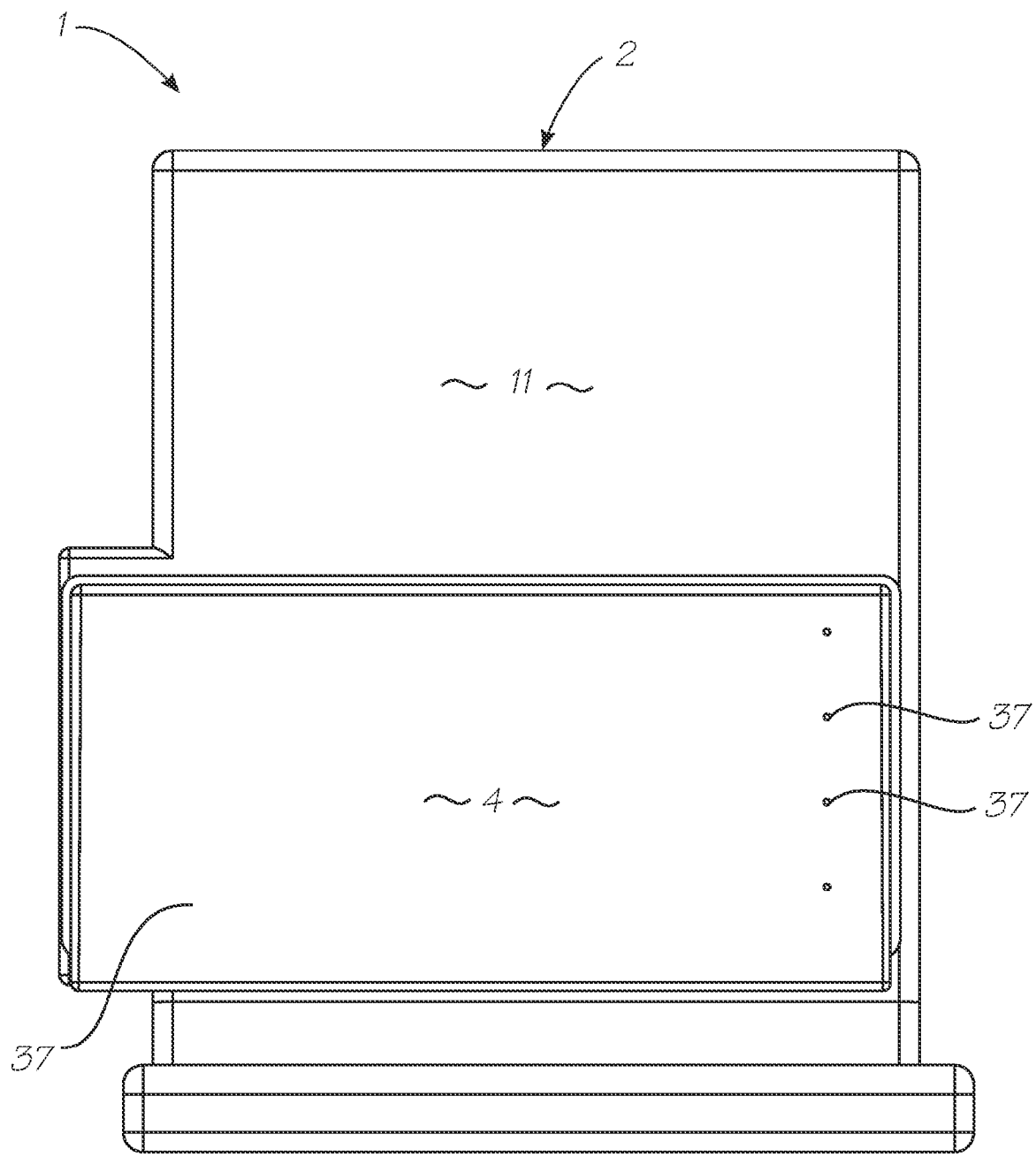
FIG. 7 is an inverted plan view of the cartridge of the previous figures.
Figure 8:
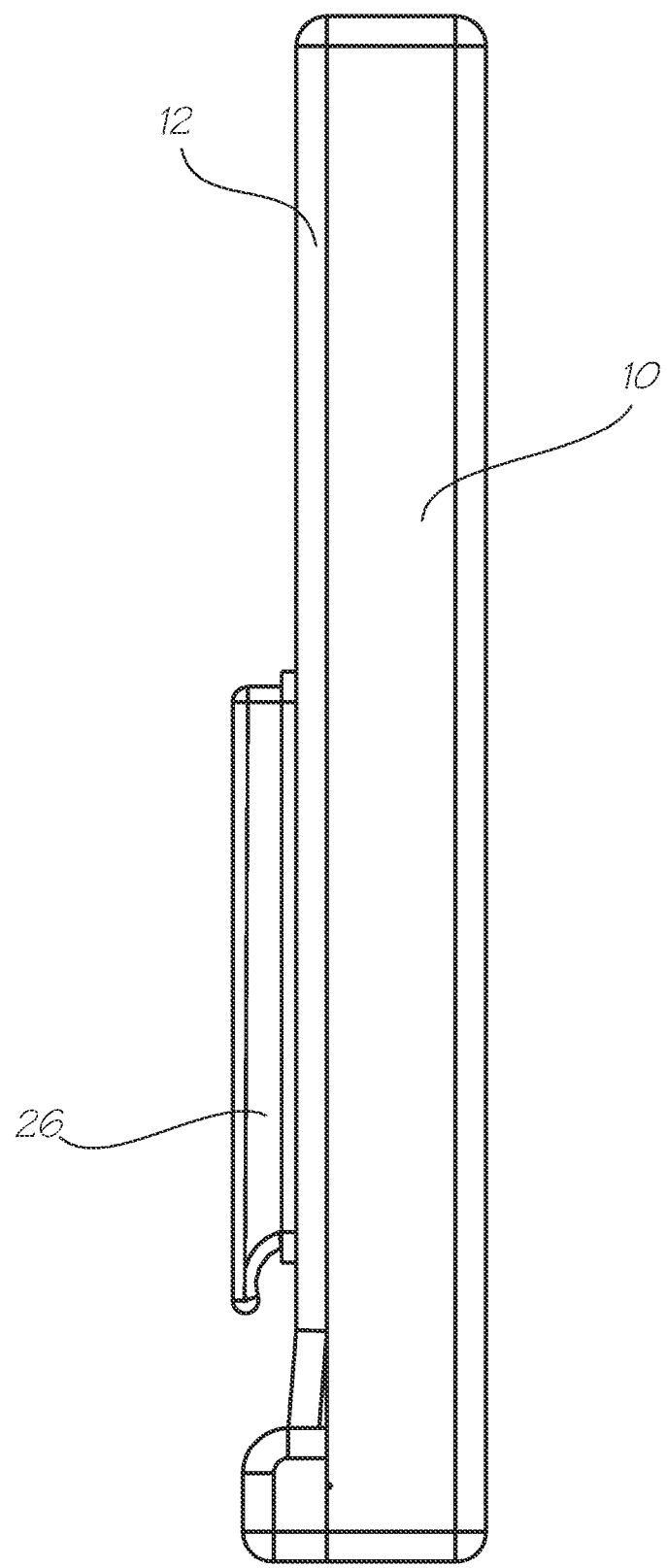
FIG. 8 is a left hand side view of the same cartridge.
Figure 9:
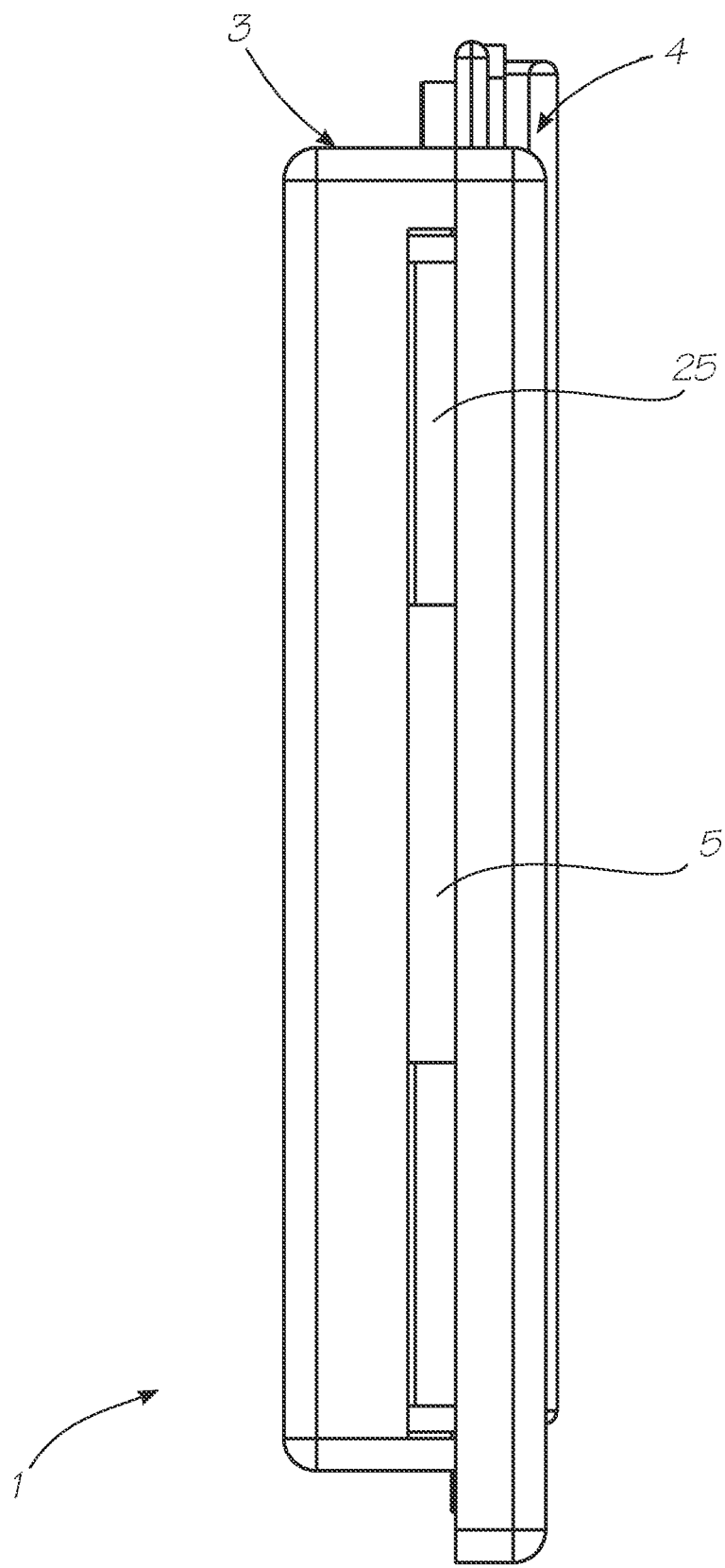
FIG. 9 is a front view of the same cartridge.
Figure 10:
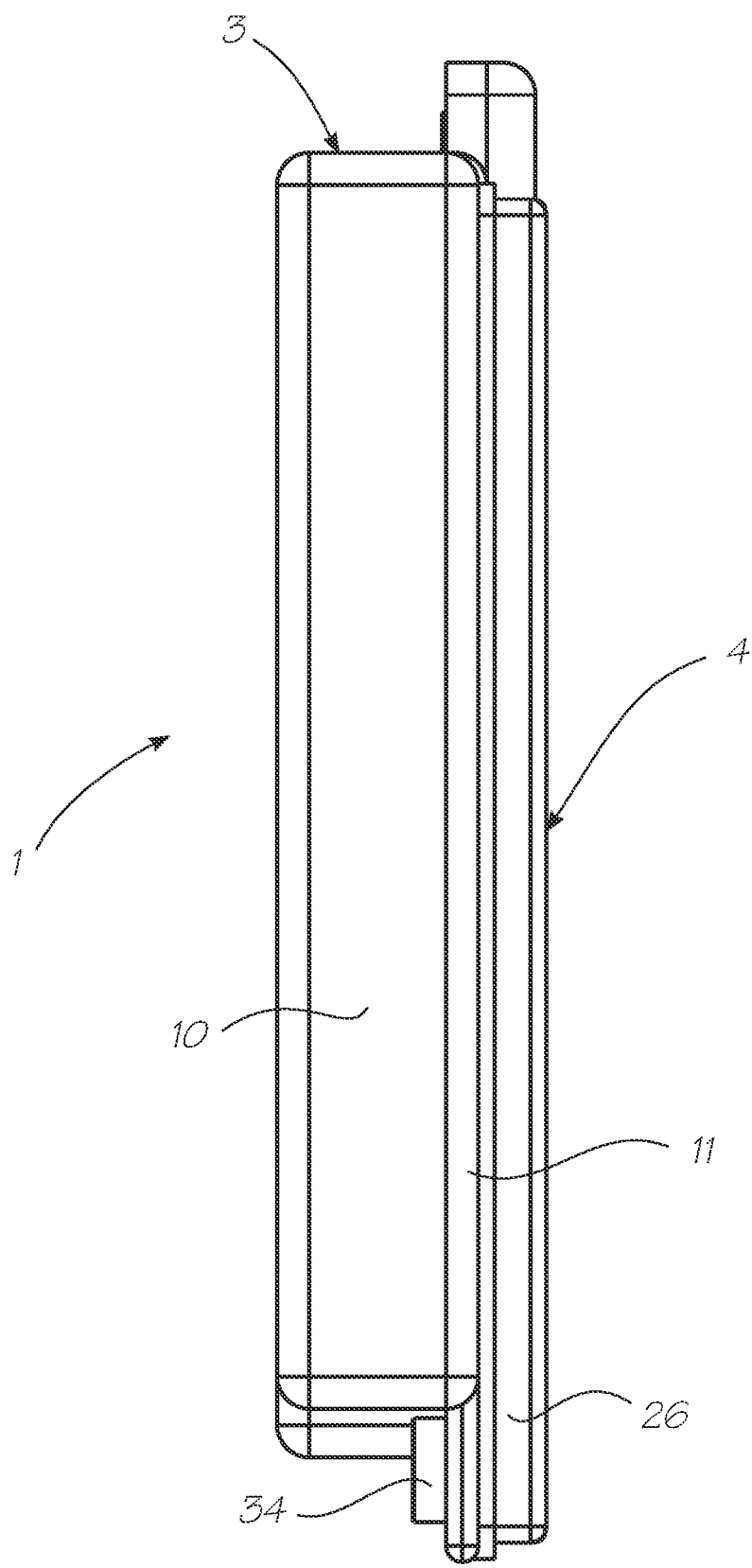
FIG. 10 is a rear view of the same cartridge.
Figure 11:
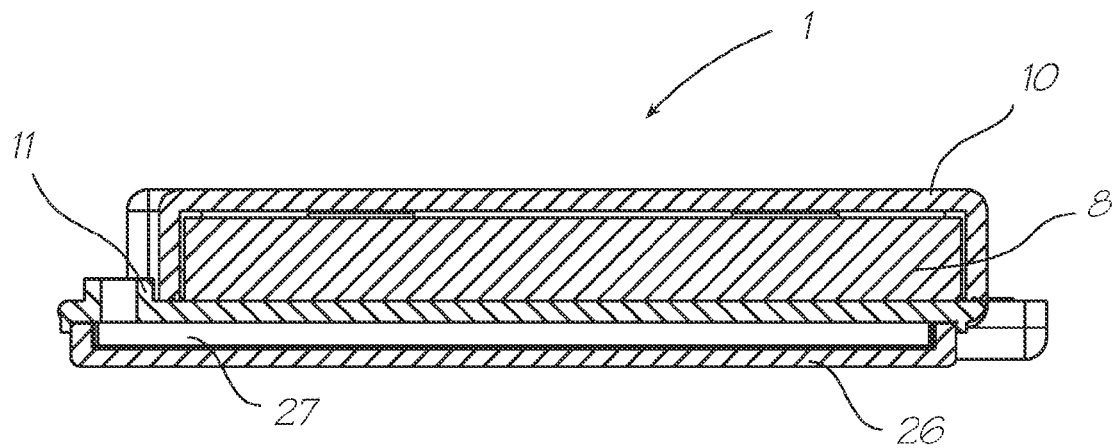
FIG. 11 is a sectional rear view taken on line 11-11 of FIG. 5.
Figure 12:
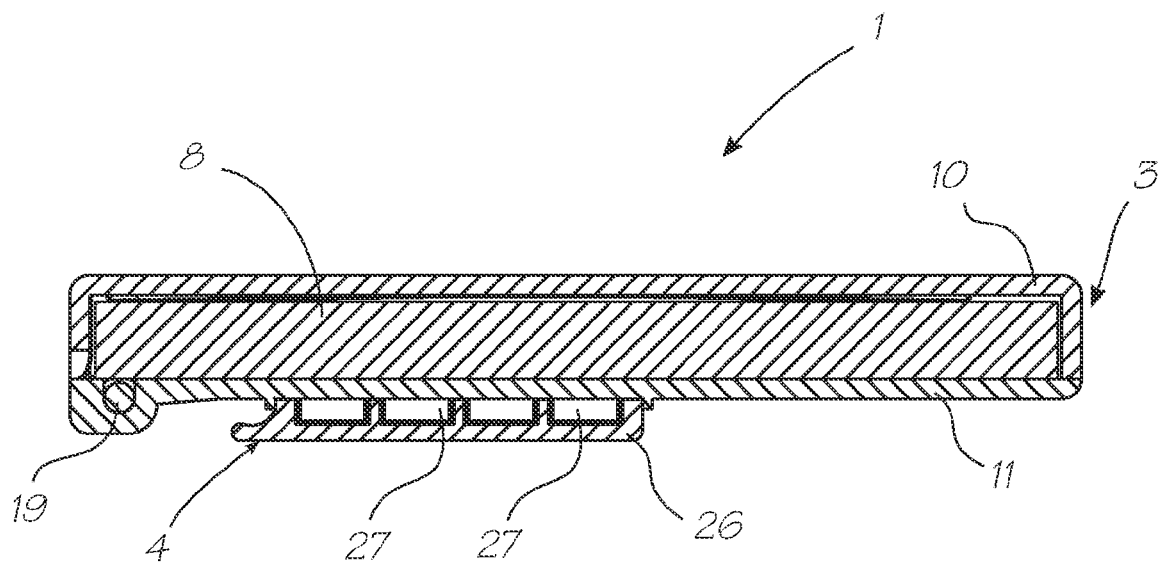
FIG. 12 is a sectional side view taken on line 12-12 of FIG. 5.

Referring to the drawings, there is shown a cartridge 1 for a printing device including a casing shown generally at 2. In the illustrated preferred form, the casing is divided into two main portions comprising, a print media supply portion 3 for housing sheets of paper and the like, and a second storage portion 4 for housing an ink supply. This cartridge is designed for use with digital printing devices, and is particularly suitable for drop-on-demand ink jet printing devices.

The casing 2 also defines a print media exit opening 5 that connects with the print media storage portion 3 and a print media transport mechanism shown generally at 7. This transport mechanism is disposed within the print media housing portion 3 adjacent the print media exit 5, such that upon operation it picks up and drives the print media 8 out through the print media exit opening.

Turning first to consider the elements of the print media storage portion of the cartridge, it can be seen to comprise a media top molding 10 which mates with a corresponding bottom molding 11. In this manner the moldings combine to define a generally rectangular print media storage region 12 in which is housed print media in the form of a stack of paper sheets or cards.

The top and bottom moldings 10 and 11 are both configured at a front end to define, in combination, the print media exit opening 5. In use, the stack of cards 8 is disposed within the storage region 12. These are biased downwardly toward engagement with an upper surface 14 of the bottom molding 11 by means of thin metal springs 15 which bear against an inner lower surface 16 of the top molding 10.

The print media transport mechanism of the preferred form illustrated is in the form of a geared pick up roller assembly 18. This assembly includes a drive shaft 19, pick up rollers 20 that are rigidly secured to the drive shaft, and an external drive gear 21.

The transport assembly 18 is captively retained within the casing portion formed by the top and bottom print media moldings, the drive shaft 19 being rotatably supported by means of arcuate ribs 22 formed in a channel 23 located beneath the exit opening 5. The top molding fully encloses the portion of the drive shaft holding the pick up rollers 20, but leaves the external drive gear 21 exposed as shown. In an alternate form, the drive gear may be accessed via an opening in the casing for engagement with a corresponding powered roller on the printer device. A plastic or metal foil 25 is also provided adjacent the exit opening 5. This foil is sized to extend downwardly across the exit such that once the transport mechanism is operated, only a single sheet of paper or card is driven through the exit at any one time.

The ink storage portion 4 is similarly defined by two separate moldings forming part of the cartridge casing. The primary molding is the ink storage base molding 26 which is configured to define a plurality of distinct ink chambers 27. Ultimately, the chambers are sealed by direct or indirect connection of this base molding 26 to a cover molding, which in this preferred form is provided by an underside 28 of the print media storage bottom molding 11.

In the preferred form shown, the connection of the two moldings is indirect, as there is provided an intermediate thin walled deformable film 30 which is preferably initially contoured to nest within the ink chambers 27 defined in the base molding 26. During assembly, the base molding 26 is sealingly connected with a flange 31 provided around the periphery of the thin walled deformable film 30 which in turn is sealingly connected with the underside 28 of the print media storage bottom molding 11.

As can be seen from the drawings, the ink chambers base molding 27 preferably extends beyond the peripheral edge of the print media storage region above, so as to define an ink supply connection manifold region 32. The upper portion of the manifold 32 is formed as an extension 33 of the print media storage bottom molding 11 and includes thereon a plurality of ink connection nozzles 34 which are closed by means of pierceable ink seals 35. In use the ink is stored above the deformable film and is thereby in fluid communication with the ink connection nozzles 34. In order to facilitate collapsing of the deformable film 30 as the ink is withdrawn, air vents 37 are provided in the ink storage base molding 26, preferably at the end remote from the ink nozzles. The various components of the cartridge casing can be assembled by any suitable means including use of adhesives, ultrasonic welding or mechanical fasteners or the like.

A preferred application of the cartridge of the invention as hereinbefore described is for use in a video games console having an integral printer of the kind described in Australian provisional patent application PP7020 and corresponding US application entitled "A video game console with integral printer device" filed concurrently herewith, the contents of which are incorporated herein by reference.

In use, the cartridge of the invention is inserted into an appropriately configured printer device whereby the drive gear 21 aligns with and engages a corresponding driven gear provided on the printer mechanism. The advantages of this configuration are numerous. Most importantly, the provision of the transportation means within the cartridge ensures that the paper or other print media is fed out of the cartridge accurately and with minimum initial contamination, as the mechanism and print media are housed within an enclosed unit. In cartridges of the prior art, the cartridge is pressed onto a pick up roller mounted in the printer device, which exposes the paper on the underside. By contrast, the present design allows for greater structural integrity as there is no need to provide an opening that exposes the print media to that same extent. Further, the design provides for a tamper proof unit.

Additional advantages relating to the preferred forms include the provision of seals over the ink outlet nozzles that are pierceable automatically by the printer mechanism upon loading. In this regard, the cartridge is intended only as a single use product. Additionally, the structure of the ink chamber molding whereby the deformable film and base can be molded or joined in a simultaneous operation to form a completely sealed ink chamber, clearly offers manufacturing cost and efficiency advantages.

It will be appreciated by those skilled in the art that whilst the invention has been described with reference to a specific example, the concept can be embodied in many other forms. For example, the print media transport mechanism need not be limited to a pick up roller mechanism, but could include any other suitable mechanisms which can be externally driven from outside the cartridge casing. Similarly, the means of storage of the ink is not limited to the form described and could include the use of other deformable or non-deformable storage means. Accordingly, the preferred embodiment described should be considered in all respects to be illustrative and not restrictive.

We claim:

1. A print media cartridge comprising:
   a housing assembly having top and bottom housing members that defines a region between the top and bottom housing members for storing a stack of print media sheets;
   an ink storage assembly mounted on an underside of the bottom housing member, the ink storage assembly and the underside of the bottom housing member defining at least one ink chamber therebetween, each ink chamber including a deformable film for receiving ink between the deformable film and the underside of the bottom housing member; and
   ink connection nozzles in fluid communication with each respective ink chamber,
   wherein a portion of the bottom housing member extends beyond a peripheral edge of the top housing member to define an ink supply connection manifold with the ink storage assembly, the ink connection nozzles being located on the ink supply connection manifold.

2. A print media cartridge as claimed in claim 1, further comprising a sheet transport mechanism mounted in the housing assembly to feed the sheets from the housing assembly.

3. A print media cartridge as claimed in claim 1, in which each ink connection nozzle includes at least one piercable ink seal which seals the at least one ink chamber.

4. A print media cartridge as claimed in claim 3, in which the ink storage assembly includes at least one air inlet in communication with the at least one ink chamber on a side of the deformable partition opposite the side on which the ink is contained.

5. An ink and print media cartridge as claimed in claim 1, wherein the ink storage assembly defines elongate channels substantially spanning a width of the ink storage assembly and the bottom housing member.

* * * * *